Patented June 3, 1924.

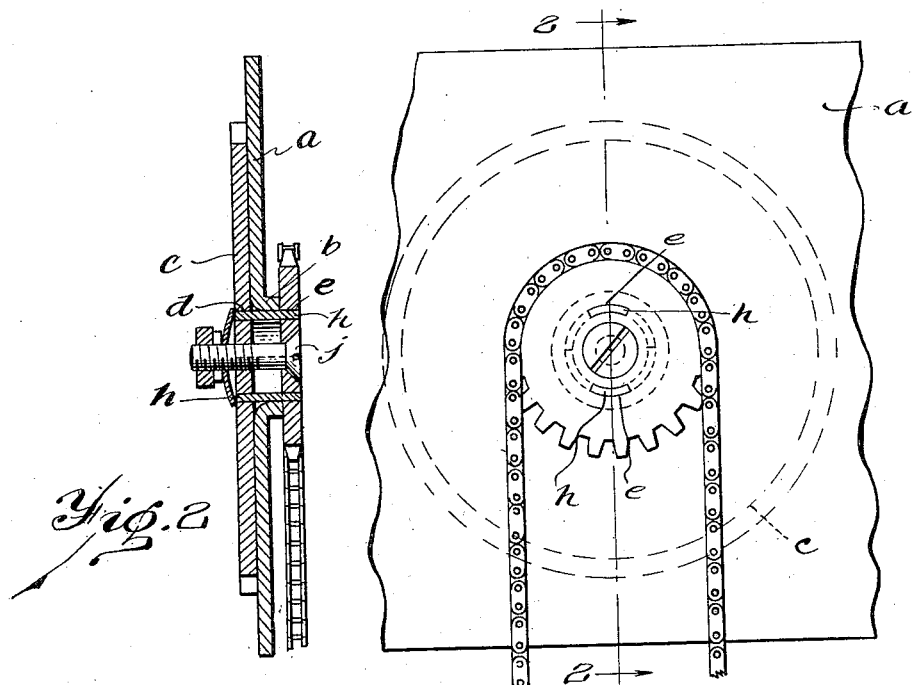
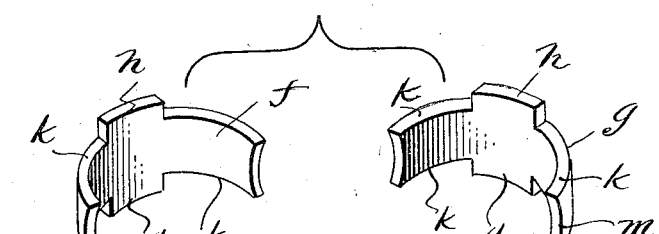

1,496,111

UNITED STATES PATENT OFFICE.

CHRISTIAN ANDERSEN, ERNEST E. HEINTZ, AND FRANK EDGAR, OF DETROIT, MICHIGAN, ASSIGNORS TO TERNSTEDT MANUFACTURING COMPANY, OF DETROIT, MICHIGAN, A CORPORATION OF MICHIGAN.

WINDOW-REGULATOR BEARING.

Application filed August 25, 1922. Serial No. 584,210.

*To all whom it may concern:*

Be it known that we, CHRISTIAN ANDERSEN, ERNEST E. HEINTZ, and FRANK EDGAR, citizens of the United States, residing at Detroit, in the county of Wayne and State of Michigan, have invented certain new and useful Improvements in Window-Regulator Bearings, of which the following is a specification.

This invention relates to a window regulator bearing or bushing for connecting two rotary members such as the driven gear and the chain sprocket.

In a window regulator it is customary to use a supporting plate at the top. Rotatably secured in this supporting plate is a sprocket or pulley wheel and also a driven gear. Various devices have been used to connect the sprocket and gear in driving relation and rotatably support them in the plate. At present it is common to use a rather complex stub shaft member which is a screw machine product, and requires an expensive tooling up to make the same. It is the object of the present invention to provide an effective member for this purpose which may be manufactured very cheaply, as it may be shaped by a rolling operation and cut by a punching operation. This will be more fully described hereinafter.

In the drawings:

Fig. 1 is a rear elevational view of the top of the window regulator.

Fig. 2 is a sectional view on the line 2—2 on Fig. 1.

Fig. 3 is a composite perspective showing the two parts of the bearing or bushing.

The regulator supporting plate is designated $a$. This is punched out to form a circular boss $b$, which forms the bearing support. The driven gear wheel $c$ is punched with a pair of segmental slots at the points $d$. The spocket wheel is likewise punched with a pair of segmental slots at the points $e$.

The bearing or bushing is preferably constructed of brass and comprises a pair of half rings $f$ and $g$, each of which is provided with a pair of oppositely directed longitudinally extending lugs $h$. These lugs fit into the segmental slots $d$ and $e$, and consequently key the sprocket and the driven gear together. A bolt $j$ with a countersunk head fits into the sprocket wheel and bolts the driven gear $o$ and the sprocket wheel against the shoulders $k$ formed on the split bushing in the spaces intervening between the lugs $h$. Consequently when the two halves of the bearing or bushing are inserted in the bearing boss $b$, and the driven gear and the sprocket are fitted onto the lugs $h$, and when the bolt is inserted into the sprocket through the gear and the nut tightened, obviously the sprocket and the driven gear are rigidly tied together. The gear, sprocket wheel and bushing will be removably assembled into the bearing support formed by the boss in the plate $a$. This forms an easily manufactured and a quickly removable bearing for rotatable members in this connection.

Attention is invited to the unique construction of the bearing bushing. By dividing the bushing into halves, the stock out of which the bearing or bushing is constructed, can be rolled in long strips on a rolling machine. The strips may then be put into a punching die and punched out in the form of halves such as is shown in Figure 3. The action of the punching die on it causes the ends to be slightly curved as $m$ shown in Fig. 3. Hence the strips are rolled a $\frac{1}{32}$ of an inch less than the two halves so that when the half rings are taken from the dies they form half rings which complete the bushing when assembled together.

What we claim is:

1. In a window regulator, the combination of a plurality of rotary members, a longitudinally split tubular bushing or bearing keying the said rotary members in driving relation with each other and means running through the axes of the rotary member and bushing for clamping the parts together.

2. In a window regulator, the combination of a plurality of rotary members, a longitudinally split bushing or bearing securing the said rotary members in driving relation with each other and a bolt with a nut on its end running through the axes of the bushing for clamping the rotary members and bushing parts together.

3. In a window regulator, the combination of a plurality of rotary members provided with slots, and a bushing or bearing for keying the said rotary members together and provided with lugs adapted to engage in said slots in said rotary members, and means for binding the rotary members and the bushing together along their axes.

4. In a window regulator, the combination of a plurality of rotary members provided with slots, a split tubular bushing or bearing keying the said rotary members together divided longitudinally substantially into halves and provided with lugs projecting from each half adapted to engage in said slots in said rotary members, and means for binding the rotary members and the bushing together along their axes.

5. In a window regulator, the combination of a driving rotary member, a driven rotary member, the said members being provided with slots, and means to key said members together in driving relation comprising a tubular bushing or bearing interposed between the same having lugs adapted to engage in said slots in the driving and driven rotary members, and a bolt passing through the tubular bushing or bearing binding the said rotary members securely against the shoulders intervening between said lugs on said bushing or bearing.

6. In a window regulator, the combination of a driving rotary member, a driven rotary member, the said members being provided with slots, and means to key said members together, in driving relation comprising a longitudinally split tubular bushing or bearing interposed between the same having lugs adapted to engage in said slots in the driving and driven rotary members, and a bolt passing through the tubular bushing or bearing binding the said rotary members securely against the shoulders intervening between said lugs on said split bushing or bearing.

In testimony whereof we affix our signatures.

CHRISTIAN ANDERSEN.
ERNEST E. HEINTZ.
FRANK EDGAR.